3,512,264
MERIDIAN-SEEKING INSTRUMENT
Leonard R. Ambrosini, Pacific Palisades, Calif., assignor to Lear Siegler, Inc., Santa Monica, Calif., a corporation of Delaware
Filed Feb. 23, 1966, Ser. No. 529,325
Int. Cl. G01c 19/38
U.S. Cl. 33—226      4 Claims

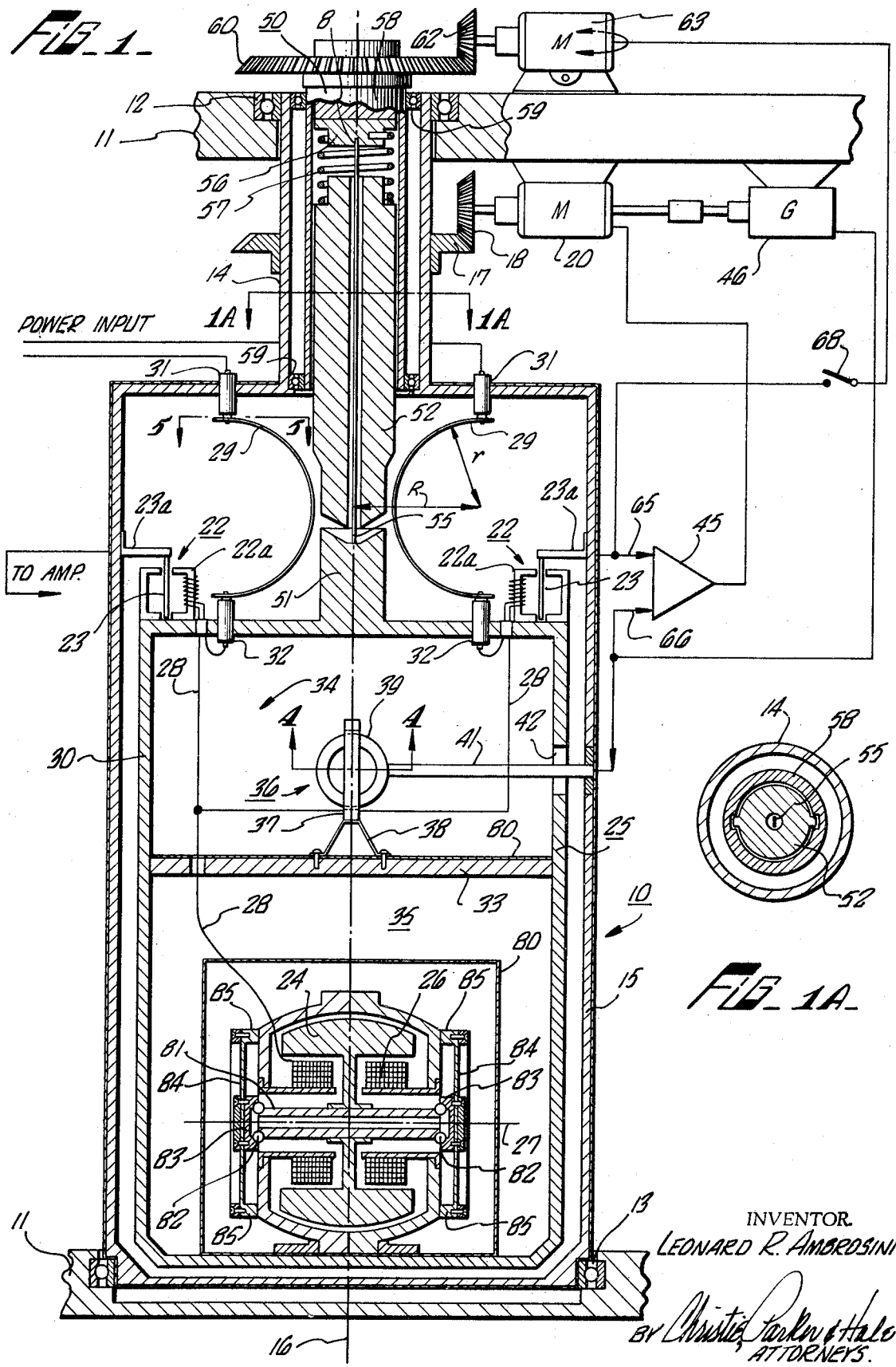

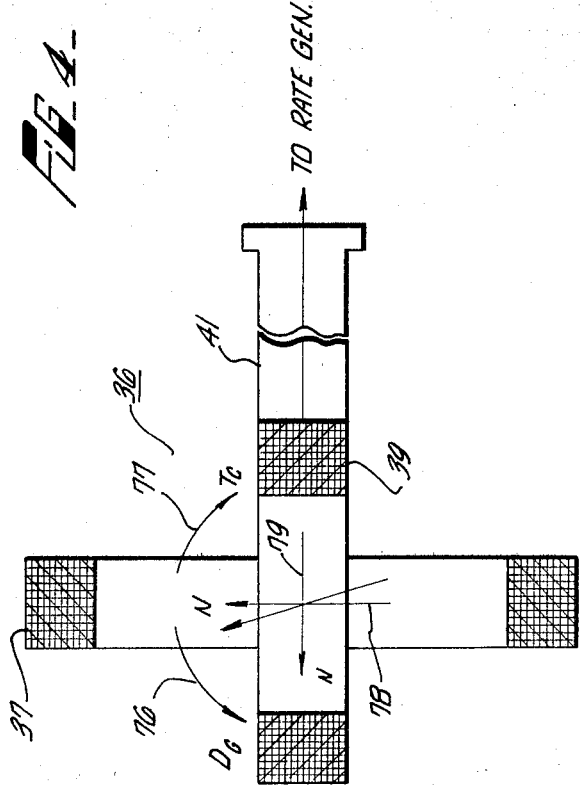
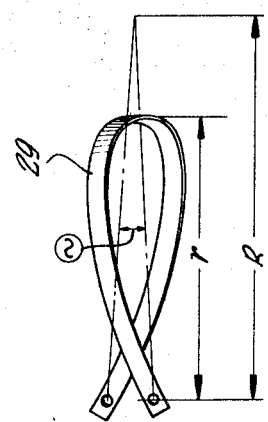
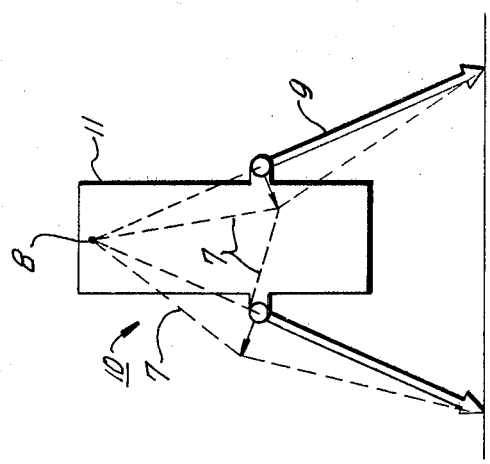
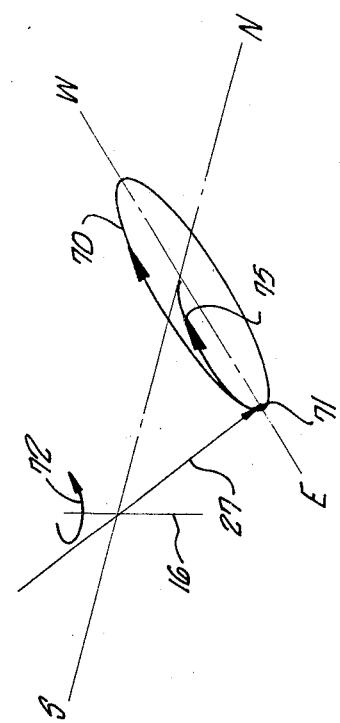

ABSTRACT OF THE DISCLOSURE

A meridian-seeking gyroscope unit is torsionally suspended within a container oriented relative to a fixed frame by a pickoff actuated follow-up motor. A torquer reacting on the container and responsive to the follow-up motor rate normally urges the gyro unit toward the pickoff nulling position. Power connection bands normally coplanar with and diverging resiliently away from the suspension axis produce thereabout only mutually offsetting torsional and flexural torques. The suspension support disc is normally pressed upward against an abutment by a spring seated on a coaxial sleeve and of such stiffness that the tension in the suspension is unchanged when the sleeve is lowered to cage the unit.

---

This invention relates to surveying instruments and, more particularly, relates to a surveying instrument for automatically determining without any overshoot the direction of true meridian.

It is well known that the earth rotates about its axis of revolution at 15° per hour. A pendulous gyroscope located on the earth's surface and including a rotor rotating about a horizontal spin axis at high speeds will precess so as to align that spin axis with the horizontal component of the earth's spin velocity. The alignment of this spin axis with the horizontal component of the earth's spin velocity locates the true north-south meridian.

Even in today's most advanced pendulous gyroscopes, there are significant torques which tend adversely to affect the gyroscope's precesson to the horizontal component of the earth's spin velocity. These torques, often termed "parasitic torques," are of random and uncontrolled nature. Such parasitic torques are caused by numerous disturbances to the meridian-seeking instrument including shock, vibration, magnetic fields external and internal to the instrument and temperature variations within the instrument itself. In addition, random torques that oppose the accurate alignment of the spin axis with the meridian are produced by the power supply leads connecting an outside source to the gyroscope rotor. These power connections represent mechanical elements which twist and hinder the instrument's accuracy. Numerous techniques have been devised in attempts to eliminate these various parasitic torques. Generally speaking, the prior art attempts of eliminating, or correcting, these parasitic torques have proved unsatisfactory.

An additional problem not solved by prior art instruments is the failure of the spin axis to align itself quickly at the meridian. Instead, the spin axis oscillates back and forth across the meridian and comes to rest on the meridian in undamped prior art instruments only after several hours or even days of operating time elapses. To avoid this long delay in determining the meridian, various techniques have been developed by the prior art. For example, one typical solution is to provide an elaborate optical scanning apparatus which determines the extremes of the oscillation of the spin axis on each side of the meridian; and a skilled technician by averaging these extremes may make a mathematical computation and thus determine the meridian direction. These optical arrangements are expensive, bulky, and thus generally unsatisfactory for most surveying operations. In addition, the accuracy of the determination of the local meridian by such optical scanning devices depends to some degree upon the skill of the person reading the peaks of the oscillation made by the spin axis about the meridian. Mechanical approaches including fluid damping, magnetic damping, and manual damping means have generally proved ineffective in that any such device which tends to oppose the meridian-seeking torque of the spin axis also acts to prevent the device from truly and accurately aligning with the meridian.

The foregoing disadvantages of the prior art are avoided in accordance with the principles of this invention where improved techniques for the elimination of parasitic torques are provided and wherein a pendulous gyroscope is electronically and automatically damped to settle with its spin axis aligned at the local meridian without adversely affecting the meridian-seeking torque which drives the spin axis to the meridian.

In accordance with this invention a meridian-seeking instrument includes a pendulous gyroscope having a horizontal spin axis which tends to align itself with the meridian in response to a precessional torque about a horizontal axis, which torque results from the earth's movement. Pick-off signal generating devices are positioned with respect to the gyroscope so as to deliver an electrical pick-off signal which is proportional to the angle of movement of the spin axis about the vertical axis. This pick-off signal is applied to a motor that drives the container in which the pendulous gyroscope is suspended, thereby causing the container to follow the rotation of the gyroscope. This pick-off signal is also applied to a torque creating device which is coupled to the gyroscope. The torque creating device is responsive to the pick-off signal and develops a counter-torque to oppose the precessional torque, whereby the spin axis arrives at the meridian with substantially zero velocity and substantially zero overshoot. The meridian-seeking instrument of this invention further comprises a thin metal band coincidentally aligned with said vertical axis for pendulously supporting said gyroscope and a pair of curved power bands which lie in a longitudinal plane coincidental to that vertical axis. These curved power bands are spring-loaded between electrical terminals which receive power from a supply source and apply that power to the gyroscope rotor. The curved power bands are in the form of semi-circles in the longitudinal plane when the spin axis is aligned with the meridian. At any location of the spin axis other than the meridian, the power bands are in the form of semi-helical loops which develop forces in opposition to the spring-loaded force to achieve a net zero torque for angular movements of the gyroscope spin axis about the vertical axis. In addition, an automatic calibration system responds to the pick-off signals when the gyroscope is not spinning for aligning the suspension band and the curved power bands in the same longitudinal plane coincidental with the vertical axis.

The foregoing and other features of this invention may more readily be understood by reference to the accompanying drawing in which:

FIG. 1 is a side elevation of a meridian-seeking instrument in accordance with the principles of this invention;

FIG. 1A is a cross-section taken along the lines 1A—1A of FIG. 1;

FIG. 2 depicts the meridian-seeking instrument of this invention encased and mounted on a tripod;

FIG. 3 depicts the damped and undamped paths traced by the spin axis in seeking out the north-south meridian;

FIG. 4 is a cross-sectional view of the torquer device of FIG. 1 taken along the lines 4—4; and FIG. 5 is a cross-sectional view of the semicircular power bands formed into a semi-helical shape.

Turning now to FIG. 1, a side elevation partially broken away of the meridian-seeking instrument 10 of this invention is shown. Instrument 10, as shown in FIG. 2, is encased by a case 11 mounted on a tripod 9. The tripod logs 9 are fastened to case 11 along axes which intersect at the suspension point 8 for pendulous gyroscope unit 25 of FIG. 1. Any vibration which may shake instrument 10, as shown by dashed lines 7, does not move suspension point 8 from its initial position. In a manner more clearly discussed hereinafter, this steady suspension point 8 establishes increased accuracy in meridan determinations by instrument 10.

Case 11 is only partially shown in FIG. 1 having upper and lower bearings pairs 12 and 13 mounted in case 11 and coupled to a cylindrical outer container 15. These bearings are low friction, and in a well-known manner allow the outer container 15 to freely rotate about a centrally-located vertical axis 16. Rotation of outer container 15 about vertical axis 16 may be achieved through the horizontally oriented bevel gear 17 which is coupled to the outer container 15, and which is engaged by a bevel gear 18 and motor 20. Of course, any other suitable gearing and driving source would suffice. The controlled rotational movement of our container 15 about vertical axis 16 will be described in more detail hereinafter.

Located within the outer container 15 is a pendulous gyroscope unit 25. This pendulous gyroscope unit 25 includes an encased stator 26 which spins a gyro wheel or rotor 24, at very high speeds about a horizontal spin axis 27. The electrical power to drive this gyro wheel 24 is supplied by power leads 28 connecting stator 26 to a pair of curved power bands 29 through insulated terminals 32 mounted in openings located in the top of a cylindrical inner container 30. These curved power bands 29 are spring-load and are electrically connected at a second pair of insulated terminal posts 31 located in openings in the top of outer container 15. Either alternating or direct current power may be supplied for the meridian-seeking instrument 10 of this invention. Such power depends upon the rotor selection and selection of other components to be described, all of which are readily available for either AC or DC operation.

Mounted on the top of the inner container 30 are a pair of pick-offs 22. Each pick-off consists of a double gap magnet 22a having a round, or square, coil 23 positioned in the air gap. Coil 23 is held in position in the air gap by a bracket 23a fastened to the inside of the outer container 15. The pick-offs 22 are wound with an energized coil in such a manner that if the sensing coil 23 deviates from the center of the gap of the magnet an electro-motive force is developed in the sensing coils 23 and a pick-off error signal is generated. An electrical connection is made between the coil 23 and amplifier 45 to apply this error signal to amplifier 45. Only one pick-off, of course, would be sufficient; however, two are used to provide greater magnitude of signal and to maintain accurate balance for the suspension system of gyroscope unit 25.

Inner container 30 of gyroscope unit 25 is divided into upper and lower chambers 34 and 35 respectively by a cylindrical partition wall 33. These two chambers are designated as the rotor chamber 35 and the torquer chamber 34. These chambers, and container 15 as well, may be filled with any suitable gas. A torquer 36, located in the torquer chamber 34, is mounted with an outer annular coil ring 37 fixedly fastened by bracket 38 to partition wall 33. Within the opening in annular coil 37 is a similar annular coil 39, which has its vertical plane transversely oriented to the vertical plane of annular coils 37. This inner annular coil 39 has an outer diameter slightly less than the inner diameter of the annular coil 37 and thus is free to move relative to coil 37. Coil 39 is permanently mounted by a bracket 41 to the inside surface of outer container 15. Bracket 41 has an opening extending through its length for housing electrical leads between coil 39, amplifier 45, and rate generator 46. These components and the circuit connections will be described in detail in the operation section hereinafter. A suitable opening 42 is provided in the inner container 30 so that the bracket 41 is allowed freedom of angular movement about the vertical axis 16 when there is relative movement between the inner and outer containers 30 and 15 respectively.

As shown in FIG. 1, the pendulous gyroscope unit 25 is in an uncaged position in that the caging piston 52 is not in contact with the similarly shaped caging seat 51 located at the top, and forming part of, the inner container 30.

A thin suspension band 55 is fastened to the caging seat 51 at one end, and at the other end band 55 is appropriately fastened to a suspension point disk 56 supported on a cylindrical spring 57. A longitudinal opening for suspension band 55 is provided along the length of piston 52 in the caging mechanism 50. This piston 52 is provided at its upper end with an offset shoulder, as is suspension point disk 56, so as to securely seat spring 57. Surrounding disk 56, spring 57, and piston 52 is a cylindrical piston chamber 58 which is mounted on bearings 59 for rotational movement about the vertical axis 16 relative to the inner wall of neck 14 of outer container 15. Piston chamber 58, as shown in FIG. 1A, includes two longitudinal grooves recessed on opposite sides of chamber 58 so as to slideably receive appropriately shaped rails of piston 52. Piston 52 is thus allowed vertical movement within chamber 58 in response to any suitable lever or solenoid operation not shown but as is well known. Piston chamber 58, FIG. 1, extends through an opening in neck 14 of outer container 15, and a second horizontally oriented bevel gear 60 is suitably fastened to piston chamber 58. Gear 60 is engaged with a bevel gear 62 that in turn is driven by a motor 63.

Amplifier 45 may be any suitable high impedance input amplifier. Inputs 65 and 66 are provided for amplifier 45. Input 65 applies the pick-off signals to amplifier 45 and input 66 applies the output from rate generator 46 to amplifier 45. Rate generator 46 is mechanically coupled to the servo motor 20. The pick-off error signals are also applied through a manually-operative calibrate switch 68 to calibrate motor 63.

OPERATION

Current for stator 26 is supplied in a manner to be described in detail hereinafter from a power source through power bands 29. This power may either be D.C. or A.C. power, depending upon the desired rotor configuration. As soon as stator 26 has gyro wheel 24 rotating at its spin velocity, the suspension gyroscope unit 25 is uncaged by an upwards vertical movement of the caging piston 52. At the moment of uncaging, if the gyroscope spin axis 27 lies in any direction other than true north and south, the gyroscope will precess in whatever direction is necessary to bring the spin axis 27 to a north/south direction.

Precessing of the gyroscope unit 25 may best be understood by reference to FIG. 3. In FIG. 3 the north/south and east/west lines are shown and the undamped path which the spin axis 27 would trace in seeking out the meridian is depicted by the elliptical curve 70. The damped path is shown by curve 75. Assuming first the undamped curve 70, the gyroscope spin axis 27, at the moment of uncaging, is positioned at point 71. Thus, spin axis 27 is not in line with a true north/south direction. At that moment, because of the earth's rotation, the pendulous gyroscope will be moved off the central axis by the earth's movement and a torque 72 in the horizontal plane perpendicular to the gyro axis 16, FIG. 1, is created. Spin axis 27 of the gyroscope unit 25 moves toward the north/south direction and this movement creates a rotational velocity of the gyroscope unit 25 about the vertical axis 16 which velocity in turn tends to drive the gyroscope unit 25 further off the central axis. The speed of the gyroscope spin axis 27 increases as it approaches the true north/south meridian. Accordingly, the speed of movement of spin axis 27 is a maximum at the north/south meridian and slows down as the spin axis passes through the north/south meridian in the easterly direction. Gyroscope unit 25, if no automatic damping is utilized, will tend to oscillate back and forth about the north/south meridian and in this oscillation continuously traverses the ellipse 70 shown in FIG. 3. Unless some form of damping is employed, spin axis 27 will continue this oscillation for a period of several hours and possibly several days before coming to alignment in the north/south meridian.

The automatic damping feature of this invention is depicted in FIG. 3 by the path 75 wherein the gyroscope spin axis 27 does not trace the elliptical path 70 but rather arrives at the true north/south meridian with zero velocity and zero overshoot. In accordance with the principles of this invention, the automatic damping scheme locates the true meridian within a matter of a few minutes as opposed to the hours and days required for prior art gyroscopes.

AUTOMATIC DAMPING SYSTEM

When gyroscope 25, FIG. 1, is uncaged, the gyroscope spin axis 27 commences to precess about the vertical axis 16 in the manner just described. This precessing or rotational movement twists the suspension band 55 a small amount. In its initial condition the pick-off coils 23 were positioned in the center of the electromagnets 22a and thus no signal is initially developed by the pick-offs 22. Precessing movement of the gyroscope 25, however, displaces the pick-off coils 23 slightly with respect to their initial position in the electromagnets 22a and an error signal is generated in coils 23. This error signal is proportional to the angular difference between the outer container 15 and the inner container 30. This error signal is applied to lead 65 which is one input for amplifier 45. The amplified signal from amplifier 45, in turn, drives the servo motor 20 which motor creates a torque that is sufficient to drive the outer container 15 into substantial alignment with inner container 30.

This technique thus provides a follow-up system in that the outer container 15 is constrained to follow the movements of the inner container 30. Of course, the movements of the inner container 30 are in turn caused by the precessing movements of the pendulous gyroscope unit 25 in its attempts to seek out the true north/south meridian. Accordingly, the outer container 15 follows the movement of the spin axis 27 of the gyroscope unit 25 as it moves about the vertical axis 16. Connected to motor 20 is a rate generator 46 of any type well-known in the art. This rate generator 46 is driven by the electrical motor 20 and produces an electrical output signal which is proportional to the speed, or rate, of rotation of the motor 20. This electrical output from the rate generator 46 is in turn applied to the torquer unit 36 which is located in torquer compartment 34 of the pendulous gyroscope unit 25.

Reference to FIG. 4 shows a horizontal cross-section of torquer 36 and is helpful in understanding the automatic damping operation of this invention. In FIG. 4, arrow 76 labeled $D_g$ represents the angular displacement of the gyroscope unit 25 as the gyroscope spin axis 27 moves toward the north-south meridian. In accordance with the principle of this invention the output of the rate generator 46 delivers an electrical signal to the torquer 36 which produces a torque on the inner container 30 which opposes the angular displacement $D_g$. This countertorque is shown by arrow 77 which is labeled $T_c$. The manner in which this countertorque $T_c$ is produced is depicted in FIG. 4, wherein annular magnetic coils 37 and 39 are shown in cross-section and transversely oriented with respect to each other. Annular coil 37 is mounted on the partition wall 33 and thus is permanently fixed with respect to the inner container 30. The magnetic field established by coil 37 is shown by arrow 78. It should be understood that this magnetic field may be caused either by direct or alternating current in coil 37, depending upon the power input source. In any event, however, at any given moment of time the magnetic field 78 established by coil 37 may be approximately in the direction shown. Coil 39 which is permanently fixed by bracket 41 to the outer container 15 is at any same given moment in the direction shown by arrow 79. Coils 37 and 39 are thus wound so that the north and south poles of the magnetic fields 78 and 79 are 90° apart. A movement of the gyroscope unit 25 in the direction shown by torque arrow 76 tends to move the magnetic field 78 into the counterclockwise position shown in FIG. 4. The output signal from rate generator 46 is applied of proper phase (AC) or polarity (DC) to coil 39 so as normally to increase the strength of the transverse magnetic field 79. Inasmuch as like magnetic poles tend to repel each other, this increased strength opposes the movement of coil 37 and because of the interrelationship between the two coils establishes a countertorque such as that shown by arrow 77. This countertorque $T_c$ is continually being applied to oppose the angular displacement $D_g$ of the gyroscope unit 25 as it seeks out the true north/south meridian. The automatic damping operation as shown by curve 75, FIG. 3, assures that spin axis 27 aligns with the north/south meridian with substantially zero velocity and with substantially zero overshoot. It should, of course, be understood that although this operation has been described with respect to one instant in time, it is a continuous operation that may require several minutes to achieve accurate alignment between the gyroscope spin axis 27 and the north/south meridian.

CURVED POWER BANDS

As mentioned in the introduction portion of the specification, the precessional torque which tends to align the spin axis 27 of gyroscope unit 25 with the meridian is exceedingly small. Therefore, every effort must be made to eliminate all random and uncalculated torques. A particular problem which has plagued prior art attempts is the problem caused by power bands utilized in supplying electrical energy from an outside power source to the stator 26. These bands are connected between the outer and inner casings 15 and 30, respectively. In accordance with the principles of this invention, a pair of thin flat power bands is provided in the form of semicircles opening away from the suspension band 55. These curved power bands 29 lie initially in a longitudinal plane containing the vertical axis 16, and thereby also containing suspension band 55. The power bands 29 may be of a material selected from such materials as a Phosphor bronze alloy, or other similar alloys such as silver-copper or beryllium-copper to cite some examples. These materials when formed into a flat thin band and curved in the manner shown exhibit a spring force wherein each band tends to return to its original flat elongated position. Accordingly, the bands produce forces in opposite directions on each of the terminals 31 and 32 on both sides of band 55. This force is proportional to the modulus of elasticity of the material which, by proper selection, may be of a controlled and predetermined amount.

With the inner and outer containers 30 and 15, respectively, aligned in an initial position corresponding to the spin axis 27 being properly aligned with the meridian, the power bands 29 are in the shape of back-to-back semicircles. Because of their location on each side of the suspension band 55 and lying in the same longitudinal plane as band 55, all forces are balanced for the gyroscope unit 25. However, when the inner and outer containers move angularly with respect to each other about the vertical axis 16, this angular displacement between the containers deforms the power bands 29 from their initial semicircular shape into a semihelical shape. Thus, each band as a result of the angular displacement $\theta$, as shown in FIG. 5, assumes the shape of one-half of a helix loop. If the relation of the radius of the semicircular power band (designated by $r$) to the distance from the center of the semicircle generated by $r$ from the center of the suspension band 55 (designated by R) is expressed by the ratio $R/r$ and if this is made equal to $\pi/2$, then each section of the helical loop exerts the same force as every other section of the helical loop. There is thus present a force on each end of the power band which tends to return it to its semicircular shape. This force, which is dependent mainly upon the modulus of torsion of the power band material, may be selected to be substantially equal and opposite to the spring force which tends to straighten out the semicircular bands 29 into their original flat elongated position. These two forces opose each other and thus result in substantially zero net torque present. Accordingly, random torques caused by prior art power bands are eliminated by the power band configuration of this invention.

ACCURACY IMPROVEMENTS

The accuracy of the gyroscope of this invention, for the purpose of determining the earth's meridian, is greatly improved over previous known instruments for the reason that the follow-up system removes any twists from the suspension band, and further because the power bands produce no random twists or torques during the meridian-seeking movement of the gyroscope unit 25. As mentioned in the introduction of the specification, there are numerous factors which in prior art instruments were critical and which created difficulties in determining the true meridian. These difficulties include temperature variations between different parts of the instrument as it goes through its operating cycles, vibration in the immediate area where the meridian-seeking instrument is mounted, as well as stray magnetic fields which may exist both from the operating components of the instrument itself and from magnetic fields inherent at the situs of operation of the instrument. In addition, repeated caging and uncaging places stress on the suspension system with the result being a change in the parameter for the suspension band. These changed parameters in the suspension system often introduce inaccuracies in prior art instruments. These various disadvantages in accuracy and operating characteristics of the prior art are avoided by the principles of this invention.

For example, in case there is any tendency for the gyroscope unit 25 to swing to and fro in pendulum fashion, by movements in the vertical plane, the space between the outer wall of the container 30 and the inner wall of the outer container 15 is made very small. This small space, or gap, for example, may be in the order of twenty-five thousandths of an inch, and may be filled with air or heavy gases. This air gap is large enough to allow slight rotational motions during the precessing movements of the gyroscope, but is small enough to create effective damping of larger vertical movements.

Magnetic differences between one part of the instrument and another part, is the gyroscope unit 25 moves in the direction of the meridian, often exist. These differences in magnetic coupling are often referred to as magnetic shifts from one azimuth position of the gyroscope to another azimuth position. Disadvantages resulting from such magnetic shifts may be avoided by this invention wherein a material of high permeability, such as mu metal, is formed into a casing 80 for the gyroscope rotor 26 and is also used to coat the outside surfaces of the inner and outer containers 30 and 15, respectively. This magnetic shielding 80 is also present on the upper surface of partition wall 33 to shield the rotor 26 and gyro wheel 24 from any possible magnetic shifts induced by the magnetic fields of torquer 36. Inasmuch as the follow-up system assures the inner and outer containers 30 and 15, respectively, move together in phase, these magnetic shields 80 eliminate any magnetic shifts in the instrument, and thus improve its accuracy.

When a meridian-seeking instrument is first turned on, the various moving parts in the instrument experience considerable thermal variations. The accuracy of the meridian determination, if such variations are not compensated for, may be seriously affected and result in several seconds, or even minutes, of arc error. In prior art meridian instruments, proper selection of the types of metals utilized in the instrument eliminates some, but not all, thermal variations, or so-called "thermal transients." I have discovered that the most significant cause of errors due to thermal transients is the pressure caused to the gyroscope wheel bearings. Different temperatures in the gyro rotor itself change the pressure on the gyro wheel bearings and tend to shift the position of the gyroscope axis off from the true north/south meridian.

In FIG. 1 the gyroscope wheel 24 is mounted on a rotatable shaft 81 which shaft includes a pair of coxial and parallel aligned low friction bearing units 82. The bearing races 83 are fixed to a flexible membrane or diaphragm 84 which is held at its outer periphery by an annular ring support 85. This flexible mounting means 84 for the bearing races 83 allows the bearings, which may be ball bearings or other low friction bearings, to shift axially due to thermal changes in the rotor itself. A constant load is thus present on the bearings 82. By this technique the bearings maintain their coaxial and parallel alignment and still exert a constant bearing pressure on the rotatable shaft 81. This constant pressure in turn assures that gyroscope wheel 24 maintains its horizontal position with respect to vertical axis 16. It is this horizontal position for gyroscope wheel 24 which prevents any error in the final meridian determination. It should be understood that other elastic supporting means for the ball bearings would be sufficient in place of the flexible diaphragms 84. For example, elastic bushings, or other elastic spring means could be employed so long as the load on the rotatable axis 81 is maintained constant for thermal variations within gyroscope 25.

AUTOMATIC CALIBRATION SYSTEM

The instrument of this invention may be caged and uncaged without varying the repeatability of suspension band 55 because the caging mechanism 50 of this invention continuously maintains constant tension on the suspension band 55 when it is in both the caged and uncaged positions. When the caging piston 52 descends into the caging seat 51, its movement decreases the deformation of spring 57. The spring rate for spring 57 is selected such that when the spring is extended far enough for the piston to engage the seat, it exerts force on the suspension point disk 56 which is identical to the force normally caused by the gyroscope unit 25 when it is suspended by suspension band 55 in an uncaged position. Accordingly, the suspension point disk 56 serves to relieve all additional tension on the suspension band 55 during the time the instrument is caged and band 55 is at all times subjected to a constant tension.

In spite of all precautions which may be employed in the caging and uncaging, vibrations caused by transportation of a meridian-seeking instrument result in some angular displacement of the inner container 30 relative to the outer container 15. This angular displacement, unless compensated for, results in a slight twist in suspension band 55 which twist may represent several seconds or minutes of arc in deviations away from the true meridian. The meridian instrument of this invention calibrates any such angular displacement and automatically compensates for that angular displacement. This automatic calibration and compensation requires the gyroscope unit 25 to be uncaged and at rest, i.e., no power is supplied to the gyroscope stator 26. Conventional switches not shown in FIG. 1 may be employed to achieve this interruption of the power to stator 26. Without any power applied to the gyroscope stator 26 gyro wheel 24 is not kept spinning and inner container 30 assumes its natural resting position with respect to the outer container 15. If any angular displacement between the inner and outer containers has occurred during transportation or otherwise, an error signal will be generated by the pick-off magnets 22 and pick-off coil 23. This signal is applied through the calibrate switch 68 which is closed during the calibration operation. This error signal is applied to the motor 63, which in turn through its gearing arrangement rotates the piston chamber 58 slightly about the vertical axis 16. Proper rotation of the chamber 58 is achieved when the pick-off signal returns to zero indicating proper alignment between the inner and outer containers 30 and 15, respectively. In this new aligned position band 55 has been returned to its initial position without any torsional twist.

Caging piston chamber 58 may be keyed in any well known manner to hold its calibrated position, and then motor 63 may be swiveled away so that bevel gear 62 is disengaged from bevel gear 60. Of course other gearing arrangements could be used for motor 63; and motor 63 could be positioned on the outer container 15 so that it also would be driven by the follow-up system after calibration. In this instance motor 63 would not have to be swiveled out of position during meridian determinations as depicted in FIG. 1. Any adverse twists in suspension band 55 caused by transportation or otherwise is thus corrected by the simple automatic calibration and compensation apparatus of this invention. This correction, of course, may be repeated between each meridian indicating operation and after each movement of instrument 10.

A continuing application, Ser. No. 882,002, filed on Dec. 4, 1969, and assigned to the assignee of the present application, claims part of the subject matter disclosed in the present application.

What is claimed is:
1. A meridian instrument comprising:
   a stationary frame;
   a container;
   means for supporting the container so it is rotatable relative to the frame about a vertical axis;
   a gyroscope unit located within the container, the gyroscope unit having a horizontal spin axis that tends to align itself with the meridian;
   means for supporting the gyroscope unit so it is able to rotate about the vertical axis relative to the container, the supporting means exerting a restoring torque on the gyroscope unit responsive to the angular displacement of the gyroscope unit about the vertical axis from a reference position relative to the container;
   means responsive to the angular displacement between the gyroscope unit and the container from the reference position for rotating the container about the vertical axis to reduce such angular displacement;
   a pair of mirror-image, semicircular, resilient electrically conductive bands located within the container in a plane containing the vertical axis, the bands being attached at one end to the container and at the other end to the gyroscope unit so they are spring-loaded; and
   a source of electrical power in the container connected to the conductive bands to supply the gyroscope unit as it aligns itself with the meridian.

2. The instrument of claim 1, in which the geometric centers of the conductive bands are located equidistantly on opposite sides of the vertical axis and the ratio of the distance of the geometric center from the vertical axis to the radius of the bands is equal to $\pi/2$.

3. The instrument of claim 1, in which the bands are spring-loaded by an amount that approximately balances the force exerted on the gyroscope unit about the vertical axis due to the semihelical deformation resulting from angular displacement between the gyroscope unit and the container.

4. A meridian seeking instrument comprising:
   a stationary frame;
   a container;
   means for supporting the container so it is rotatable relative to the frame about a vertical axis;
   a gyroscope unit located within the container, the gyroscope unit having a horizontal spin axis that tends to align itself with the meridian;
   a suspension band,
   means for connecting the bottom of the suspension band to the gyroscope unit;
   a caging piston movable along the vertical axis into engagement with the gyroscope unit;
   a disc located above the piston, the top of the suspension band being connected to the disc so the suspension band extends along the vertical axis through the piston to exert a restoring torque on the gyroscope unit responsive to the angular displacement of the gyroscope unit about the vertical axis from a reference position relative to the container;
   a compression spring disposed between the disc and the pinston in a deformed state, the characteristics of the spring being selected so that substantially the same tension exists on the suspension band when the piston engages the gyroscope unit and when the piston is disengaged from the gyroscope unit; and
   means responsive to the angular displacement between the gyroscope unit and the container from the reference position when the piston is out of engagement with the gyroscope unit for rotating the container about the vertical axis to reduce such angular displacement.

References Cited

UNITED STATES PATENTS

| | | | |
|---|---|---|---|
| 2,510,068 | 6/1950 | Carter | 33—226 |
| 3,172,213 | 3/1965 | Eklund. | |
| 3,258,976 | 7/1966 | Krupick. | |

FOREIGN PATENTS

| | | |
|---|---|---|
| 700,403 | 12/1964 | Canada. |
| 264,187 | 9/1913 | Germany. |
| 630,657 | 10/1949 | Great Britain. |
| 1,008,282 | 10/1965 | Great Britain. |

ROBERT B. HULL, Primary Examiner

U.S. Cl. X.R.

74—5.6

UNITED STATES PATENT OFFICE
CERTIFICATE OF CORRECTION

Patent No. 3,512,264   Dated May 19, 1970

Inventor(s) Leonard R. Ambrosini

It is certified that error appears in the above-identified patent and that said Letters Patent are hereby corrected as shown below:

Column 3, line 9, "logs" should be --legs--; line 15, "meridan" should be --meridian--; line 28, "our" should be --outer--; line 39, "spring-load" should be --spring-loaded--.

Column 6, line 56, "Phosphor" should be --phosphor--.

Column 7, line 19, "opose" should be --oppose--; line 63, "is" should be --as--.

Column 8, line 22, "coxial" should be --coaxial--.

Column 10, line 36, "pinston" should be --piston--.

SIGNED AND SEALED
JAN 26 1971

(SEAL)
Attest:

Edward M. Fletcher, Jr.
Attesting Officer

WILLIAM E. SCHUYLER, JR.
Commissioner of Patents